(12) United States Patent
Beser et al.

(10) Patent No.: US 6,275,853 B1
(45) Date of Patent: *Aug. 14, 2001

(54) SYSTEM AND METHOD FOR EXTENDING COMMUNICATIONS FEATURES USING GENERIC MANAGEMENT INFORMATION BASE OBJECTS

(75) Inventors: Nurettin B. Beser, Evanston; John G. Fijolek, Naperville, both of IL (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,595

(22) Filed: May 27, 1998

(51) Int. Cl.[7] .................................................. G06F 13/00

(52) U.S. Cl. ............................................................ 709/223

(58) Field of Search ................................... 709/201, 202, 709/223, 224

(56) References Cited

U.S. PATENT DOCUMENTS

| | | | |
|---|---|---|---|
| 4,644,533 | 2/1987 | Braff et al. | 370/94 |
| 4,881,263 | 11/1989 | Herbison et al. | 380/21 |
| 5,014,234 | 5/1991 | Edwards, Jr. | 364/900 |

(List continued on next page.)

OTHER PUBLICATIONS

"Cable Modem to Customer Premise Equipment Interface Specification (Interim) SP–CMCI–I02–980317", Multimedia Cable Network Systems (MCNS) Holdings, L.P., 1998, pp. ii to 40.

"Operations Support System Interface Specification Baseline Privacy Interface MIB (Interim) SP–OSSI–B–PI–I01–980331", MCNS Holdings, L.P., 1998, pp. ii to 33.

"Cable Modem Termination System–Network Side Interface Specification (Interim Specification) SP–CMTS–N–SII01–960702", MCNS Holdings, L.P., 1996, pp. ii to 13.

"Removable Security Module Interface Specification (Interim Specification) SP–RSMI–I01–980204", MCNS Holdings, L.P., 1997, pp. ii to 48.

"Baseline Privacy Interface Specification (Interim) SP–B–PI–I01–970922", MCNS Holdings, L.P., 1997, pp. ii to 66.

(List continued on next page.)

Primary Examiner—Moustafa M. Meky
(74) Attorney, Agent, or Firm—McDonnell Boehnen Hulbert & Berghoff

(57) ABSTRACT

A system and method for managing a network using generic objects in a network device management information base (MIB). The generic objects may be used to communicate commands that perform tasks that are not addressed by the specific device objects in the MIB. The generic objects include a command script object for sending commands to a device. The generic objects also include a status object for retrieving a status of the commands and a results object for retrieving the results of the command. The generic object uses device commands that may include commands and features that have been added or updated since the MIB was defined. The generic objects provide the network manager with flexibility in extending network management tasks to include features and capabilities that are not supported by the specific device MIB.

15 Claims, 11 Drawing Sheets

U.S. PATENT DOCUMENTS

| | | | |
|---|---|---|---|
| 5,138,712 | 8/1992 | Corbin | 395/700 |
| 5,347,304 | 9/1994 | Moura et al. | 348/12 |
| 5,442,749 | 8/1995 | Northcutt et al. | 395/200.09 |
| 5,488,412 | 1/1996 | Majeti et al. | 348/10 |
| 5,489,897 | 2/1996 | Inoue | 340/870.39 |
| 5,583,931 | 12/1996 | Schneider et al. | 379/399 |
| 5,586,121 | 12/1996 | Moura et al. | 370/404 |
| 5,598,410 | 1/1997 | Stone | 370/469 |
| 5,600,717 | 2/1997 | Schneider et al. | 379/399 |
| 5,606,606 | 2/1997 | Schneider et al. | 379/399 |
| 5,608,446 | 3/1997 | Carr et al. | 348/6 |
| 5,623,542 | 4/1997 | Schneider et al. | 379/399 |
| 5,623,601 | 4/1997 | Vu | 395/187.01 |
| 5,636,211 | 6/1997 | Newlin et al. | 370/465 |
| 5,675,732 | 10/1997 | Majeti et al. | 709/235 |
| 5,710,885 | 1/1998 | Bondi | 709/224 |
| 5,761,602 | 6/1998 | Wagner et al. | 455/3.1 |
| 5,778,181 | 7/1998 | Hidary et al. | 395/200.48 |
| 5,790,198 | 8/1998 | Roop et al. | 348/460 |
| 5,790,548 | 8/1998 | Sistnizadeh et al. | 370/401 |
| 5,790,677 | 8/1998 | Fox et al. | 380/24 |
| 5,790,806 | 8/1998 | Koperda | 395/200.82 |
| 5,799,086 | 8/1998 | Sudia | 380/23 |
| 5,805,804 | 9/1998 | Laursen et al. | 348/7 |
| 5,809,252 | 9/1998 | Beighe et al. | 395/200.57 |
| 5,812,819 | 9/1998 | Rodwin et al. | 395/500 |
| 5,818,845 | 10/1998 | Moura et al. | 370/449 |
| 5,819,028 | * 10/1998 | Manghirmalani et al. | 709/224 |
| 5,819,042 | 12/1998 | Hansen | 714/756 |
| 5,828,655 | 10/1998 | Moura et al. | 370/326 |
| 5,835,720 | * 11/1998 | Nelson et al. | 709/224 |
| 5,835,727 | 11/1998 | Wong et al. | 395/200 |
| 5,841,777 | 11/1998 | Cohen | 370/433 |
| 5,852,721 | 12/1998 | Dillon et al. | 395/200.47 |
| 5,854,901 | 12/1998 | Cole et al. | 709/245 |
| 5,859,852 | 1/1999 | Moura et al. | 370/449 |
| 5,864,679 | 1/1999 | Kanai et al. | 709/238 |
| 5,870,134 | 2/1999 | Laubauch et al. | 348/12 |
| 5,872,523 | 2/1999 | Dellaverson et al. | 340/825.52 |
| 5,884,024 | 3/1999 | Lim et al. | 395/187 |
| 5,903,558 | 5/1999 | Jones et al. | 370/351 |
| 5,913,037 | * 6/1999 | Spofford et al. | 709/226 |
| 5,922,049 | 7/1998 | Radia et al. | 709/220 |
| 5,922,051 | * 7/1999 | Sidey | 709/223 |
| 5,923,659 | 7/1999 | Curry et al. | 370/401 |
| 5,943,604 | 8/1999 | Chen et al. | 455/5.1 |
| 5,954,797 | * 9/1999 | Sidey | 709/223 |
| 5,958,007 | 9/1999 | Lee et al. | 709/219 |
| 5,974,453 | 10/1999 | Andersen et al. | 395/200 |
| 5,996,076 | 11/1999 | Rowney et al. | 713/201 |
| 6,005,851 | 12/1999 | Craddock et al. | 370/329 |
| 6,006,264 | 12/1999 | Colby et al. | 709/226 |
| 6,009,103 | 12/1999 | Woundy | 370/401 |
| 6,012,088 | 1/2000 | Li et al. | 709/219 |
| 6,013,107 | 1/2000 | Blackshear et al. | 703/229 |
| 6,014,545 | 1/2000 | Wu et al. | 455/3.1 |
| 6,018,767 | 1/2000 | Fijolek et al. | 709/218 |
| 6,041,041 | 3/2000 | Ramanathan et al. | 370/241 |
| 6,049,546 | 4/2000 | Ramakrishnan | 370/412 |
| 6,049,826 | 4/2000 | Beser | 709/222 |
| 6,052,724 | * 4/2000 | Willie et al. | 709/223 |
| 6,058,421 | 5/2000 | Fijolek et al. | 709/225 |
| 6,063,077 | * 12/1999 | Bawden et al. | 709/223 |
| 6,065,049 | 5/2000 | Beser | 709/218 |
| 6,070,242 | 5/2000 | Wong et al. | 713/201 |
| 6,070,246 | 5/2000 | Beser | 713/201 |
| 6,073,178 | 6/2000 | Wong et al. | 709/229 |
| 6,075,787 | 6/2000 | Bobeck et al. | 370/395 |
| 6,091,709 | 7/2000 | Harrison et al. | 370/235 |
| 6,094,431 | 7/2000 | Yamato et al. | 370/395 |
| 6,130,880 | 10/2000 | Naudus et al. | 370/235 |
| 6,157,965 | 12/2000 | Mohammed et al. | 710/8 |
| 6,170,061 | 1/2001 | Beser | 713/201 |
| 6,185,624 | 2/2001 | Fijolek et al. | 709/239 |

OTHER PUBLICATIONS

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., 1997, pp. ii to 74.

"Security System Specification (Interim Specification) SP–SSI–I01–970506", MCNS Holdings, L.P., 1997, pp. ii to 103.

"Internet Engineering Task Force, Request for Comments 2131, Dynamic Host Configuration Protocol (DHCP)", Mar. 1997, pp. 1 to 42.

S. Adiraju, J. Fijolek, IPCDN Telephony Return MIB, Internet Engineering Task Force, "<draft–ietf–ipcdn–tri–mib–00.1.txt>," Mar. 23, 1998, pp. 1 to 26.

Kyees, P.J. et al., ADLS: *A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

* cited by examiner

FIG.5A docsTrCmCommandGroup OBJECT-GROUP

OBJECTS {
docsTrCmCdCode,
docsTrCmCdMgtStationId,
docsTrCmCdReqId,
docsTrCmCdForce,
docsTrCmCdResult ,
docsTrCmCdScript,
docsTrCmCdStatus
}

STATUS current

DESCRIPTION

"A collection of objects providing a command script interface
to the serial dial modem device"

::= { docsTrCmGroups 4 }

END

FIG.5B docsTrCmCommand OBJECT IDENTIFIER ::= { docsTrCmMIBObjects 5 } docsTrCmCdCode OBJECT-TYPE

SYNTAX INTEGER{
noError(1),
unable(2),
unrecognizedCommand(3),
noResponse(4),
notConnected(5),
connected(6),
onLine(7),
unsupportedCommand(8),
deviceDisabled(9),
deviceInTestMode(10),
testFailed(11),
deviceInSecurityMode(12),
noRTS(13),
noDTR(14),
wrongLoopbackSpeed(15),
noLoopbackInARQ(16),
pendingSoftwareDownload(17),
invalidFrequency(18),
noLoopCurrent(19),
noDialTone(20),
noLineDetected(21)
}

ACCESS read-only

STATUS mandatory

DESCRIPTION

"The value of this object indicates a further description of what went wrong when a command fails."

::= { docsTrCmCommand 1 }

FIG. 5C docsTrCmCdMgtStationId OBJECT-TYPE
SYNTAX OCTET STRING (SIZE(0..8))
ACCESS read-write
STATUS mandatory
DESCRIPTION
"This object is a generic read-write variable that a
Management Station (MS) can use to guarantee that the
results from a given command are the results of a command
issued by that specific MS. Each MS must SET a unique
value to this object when doing commands and GET the value
of this object together with docsTrCmCdResult and
docsTrCmCdReqId to detect interference from other MSs."
::= { docsTrCmCommand 2 }
docsTrCmCdReqId OBJECT-TYPE
SYNTAX INTEGER
ACCESS read-write
STATUS mandatory

DESCRIPTION

"This object contains the request ID field of the SNMP PDU which
invoked the most recent command on the telephony return modem,
if the request-id is unknown or undefined, the object contains the
value zero "

::= { docsTrCmCommand 3}

FIG. 5D docsTrCmCdResult OBJECT-TYPE

SYNTAX OCTET STRING (SIZE(0..64000))

ACCESS read-write

STATUS mandatory

DESCRIPTION

"This object can contain parameters that are raw results to the particular command being issued. "

::= { docsTrCmCommand 4 }

FIG.5E docsTrCmCdForce OBJECT-TYPE

SYNTAX TruthValue

ACCESS read-write

STATUS mandatory

DESCRIPTION

"In certain cases the telephony return modem may be in
a state where certain commands could adversely affect connections.
In such cases, a command request with this object not present or
set to 'false(2)' will result in a warning. If the operator
elects to ignore such warnings, this object can be set to
force 'true(1)' in a subsequent request to cause the command to be
carried out regardless of the potentially hazardous effect."

DEFVAL {2}

::= { docsTrCmCommand 5 }

FIG. 5F docsTrCmCdScript OBJECT-TYPE

SYNTAX OCTET STRING (SIZE(0..64000))

ACCESS read-write

STATUS mandatory

DESCRIPTION

"This object can contain parameters that specifically define a particular command or series of commands being issued directly to the dial modem. Script execution depends upon the inclusion in this string of a suitable escape sequence (usually + + +) to enter a dial modem into a command mode."

::= { docsTrCmCommand 6 }

FIG. 5G docsTrCmCdStatus OBJECT-TYPE

SYNTAX INTEGER{
none(1),
success(2),
inProgress(3),
notSupported(4),
unAbleToRun(5),
aborted(6),
failed(7)
}

ACCESS read-only

STATUS mandatory

DESCRIPTION

"This object contains the result of the most recently requested command or test, or the value none(1) if no commands have been requested since last reset."

::= { docsTrCmCommand 7 }

SYSTEM AND METHOD FOR EXTENDING COMMUNICATIONS FEATURES USING GENERIC MANAGEMENT INFORMATION BASE OBJECTS

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

A. Field of the Invention

The present invention relates to the field of network management, and more particularly to the use of managed objects to communicate with unknown devices.

B. Background of the Invention

The Small Network Management Protocol (SNMP) provides network managers with ways to manage the ever-growing complexity of networks. Networks may contain many different types of devices such as, repeaters, modems, bridges, routers and computers. Each device may contain numerous hardware and software components that affect network performance. Each type of device may be manufactured by any number of network component vendors. The SNMP provides a way for network managers to organize the massive amount of information needed to manage multi-vendor networks. For example, network management involves working with many variables that need to be defined, described and named.

A tree structured framework called the Structure of Management Information, or SMI, provides a way for defining administrative relationships, organizing network management data and assigning an identifier to every network management variable. In addition, the SNMP uses a template called Management Information Base (MIB) for defining network management variables. Network management variables are referred to as network management objects which have a name, attributes and a set of operations that can be performed on the object. A MIB consists of a set of managed objects. General examples of managed objects include a system description, a number of incoming bytes received at an interface, and the IP address assigned to an interface.

MIBs provide a convenient way to organize network information. In addition, the International Organization for Standardization (ISO) and the International Telegraph and Telephone Consultative Committee (CCITT) have instituted a global naming tree and a way of assigning identifiers to any object that needs a name. As new devices or network components are made available, MIB objects or groups of objects may be defined and added to this global tree. The advantage of using this global tree is that it provides a standard way of receiving and modifying management information on any network device. In addition, once a MIB exists in the global tree for a device, an SNMP manager can communicate with it.

MIBs are used in networks that include a managing station that has a manager program. The managing station communicates with devices on the network having programs called agent programs. Managers and agents communicate using a set of commands, or message types. For example, a GET-request message type retrieves one or more values from a managed nodes MIB. A set-request enables the manager to update appropriate variables. And a response message type returns the results get-request or set-request operation. A trap message type enables an agent to spontaneously record important events or problems. Managers and agents communicate with each other by transporting message types using one of any number of communications protocols. On commonly used protocol is a user datagram protocol (UDP).

An example of a network that uses the SNMP may include a computer having a manager program connected to a bank of modems, each having agent programs. The computer also includes an application program that provides a user with an interface for executing commands that manipulate MIB objects. One example of such an application includes the Hewlett-Packard Openview application.

Some devices may use MIBs that have been defined for particular classes of devices. For example, a modem may use MIBs defined in the "Modem Management Information Base using SMIv2" standard found in Request for Comments 1696 (RFC). RFC 1696 is hereby incorporated by reference.

One problem with using MIBs is that selected devices may be updated to include new features and capabilities that are not reflected in the known MIB for that device. Those features or capabilities may not be available to a manager until the MIB is updated. In addition, managers may determine a need to perform previously unforeseen duties relating to the management of selected devices. If these unforeseen duties are not supported by the MIB definition, they may not be performed until the MIB is updated. For example, a modem having a MIB defined for it may be updated to include new features and capabilities. These features and capabilities are not known to an SNMP manager until the MIB is updated to incorporate managed objects that make use of these features.

It would desirable to have the capabilities of extending the features and capabilities of MIB objects without having to add any new objects.

SUMMARY OF THE INVENTION

In view of the above, one aspect of the present invention is directed to a system for managing a network having at least one network device communicably connected to a network medium. The network devices include the capability of executing a plurality of device commands. The system includes a management information base corresponding to the network device. The management information base comprises at least one network object for maintaining device information and a generic object for performing tasks using the device commands. A management station issues commands to retrieve and to modify the network objects of the network devices.

In a further aspect of the present invention, a method is provided for performing network management tasks. According to the method, a management station is connected to at least one network device. A management information base is provided for the network device. The management information base includes at least one network object and a command script object. The command script object having at least one device command is sent to the network device.

These and many other advantages and features of the invention will become more apparent from the following detailed description of presently preferred embodiments of the invention.

BRIEF DESCRIPTION OF THE DRAWINGS

Presently preferred embodiments of the invention are described below in conjunction with the appended drawing figures, wherein like reference numerals refer to like elements in the various figures, and wherein:

FIGS. 5a through 5g are examples of generic managed objects in Abstract Syntax Notation Ver. 1 (ASN.1) format.

DETAILED DESCRIPTION OF THE PREFERRED EMBODIMENT

Preferred embodiments of the present invention are described below with reference to networks that use the Simple Network Management Protocol (SNMP) to carry out network management functions. The description that follows makes reference to well-known protocols and standards that are described in the following documents:

"Modem Management Information Base Using SMIv2 Standard", RFC 1696, Internet Engineering Task Force (IETF).

"A Simple Network Management Protocol (SNMP)", RFC 1157, IETF.

"Concise MIB Definitions", RFC 1212, IETF.

These documents are hereby incorporated by reference.

Figure 1:
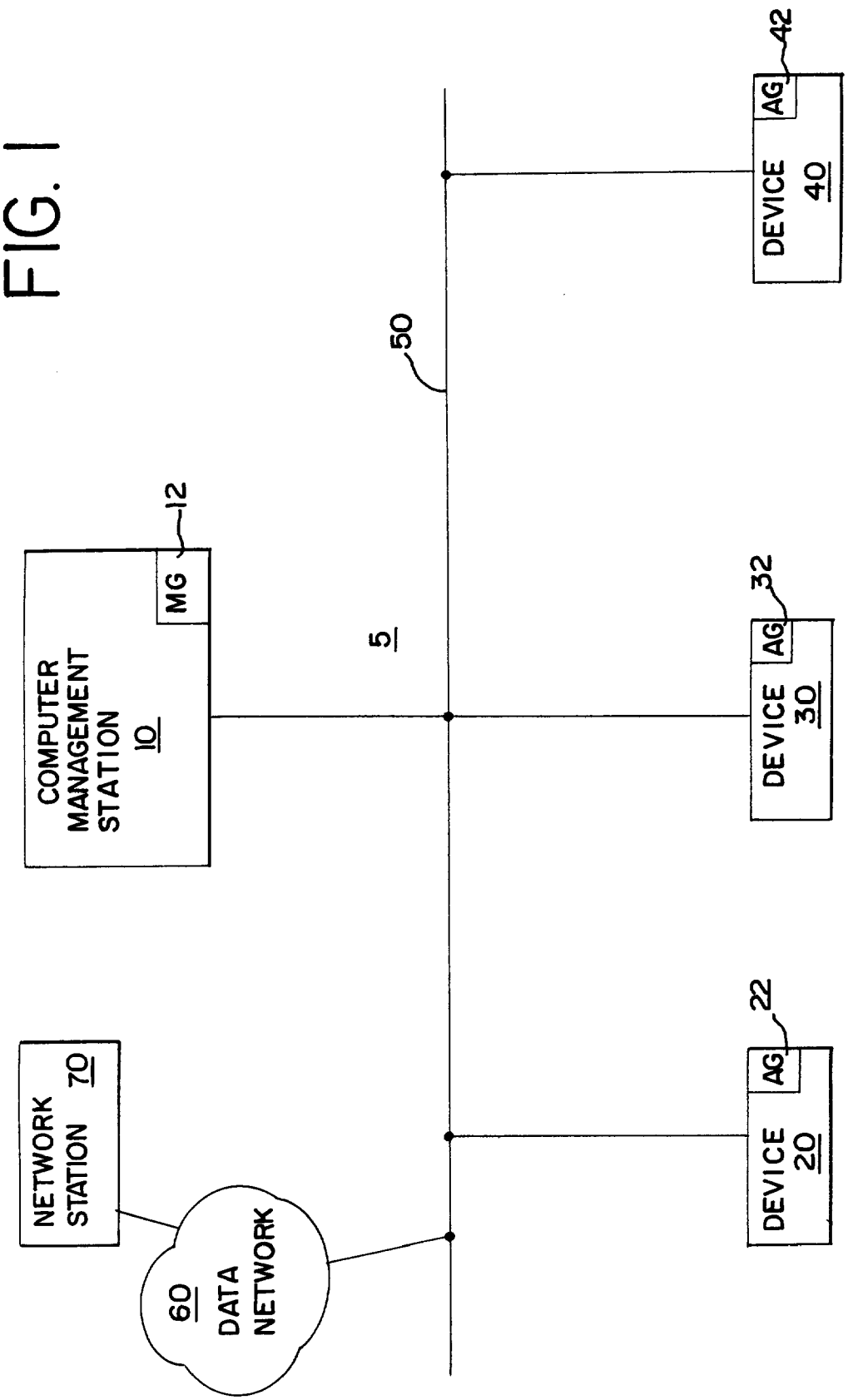
FIG. 1 is a block diagram of a network of the type in which the present invention finds advantageous use.

FIG. 1 is a block diagram of a network 5 of the type in which the present invention finds advantageous use. The network 5 communicably connects a management station 10, a first device 20, a second device 30 and a third device 40. The network 5 uses a network medium 50 to carry communications messages between the management station 10 and the devices 20, 30, 40. The network medium 50 may include any suitable medium, such as, high-frequency coaxial cable, twisted pair cable, wireless links, etc. The network 5 may use medium access protocols to communicate data such as Ethernet, token ring, etc. The network 5 may include a network interface to a data network 60 to which other devices such as network station 70 may be connected.

The management station 10 performs management tasks for the network 5 using the SNMP protocol. The management station 10 is preferably a computer having SNMP manager software 12 for managing the network 5. The SNMP manager software 12 may include MIBs, or may have access to MIBs for all devices that have been described by MIBs with valid object identifiers. The SNMP manager software 12 may access device MIBs by sending commands of message types that request the objects to receive or to modify selected objects in the MIB. The SNMP manager's software 12 communicates with a manager application (described below with reference to FIG. 2). The manager application preferably includes a user interface for invoking commands that retrieve information from devices and that change device settings or variables, or objects.

The management station 10 may include a Windows NT-based computing platform running an SNMP manager program. The manager application may include the Hewlett-Packard Openview application, or any suitable alternative.

The first, second and third devices 20, 30, 40 may include any device that communicates over a network. Examples of such devices include routers, bridges, computers, servers, modems, etc. Each device 20, 30, 40 includes agent software 22, 32, 42 for accessing and modifying objects in response to SNMP commands. Each device 20, 30, 40 may be described by a MIB, which includes variables, or objects relating to the device. One advantage of preferred embodiments of the present invention is that device that may have been improved may still be managed by an SNMP manager even if its MIB has not been updated. The management station 10 defines such devices using a generic MIB object (described further below with reference to FIG. 3). In addition, unforeseen management tasks that may not be supported by the device MIB may, nevertheless, be performed using the generic MIB object. The devices 20, 30, 40 may communicate with each other and with the management station using well-known communications protocols such as TCP/IP, UDP/IP and MAC.

The management station 10 may receive requests from other stations, such as the network station 70 for a change to an object belonging to one of the devices 20, 30, 40. The management station 10 may respond to such requests using GET and SET SNMP commands to manipulate the MIB objects of the selective device. Alternatively, the management station 10 may use the GET and SET SNMP commands and the generic MIBs to send commands to the unknown device 20, 30 or 40. A list and description of commonly used SNMP commands is given in Table 1.

TABLE 1

| SNMP Command | Description |
| --- | --- |
| GET-Request | Retrieves one or more values from a managed object in a selected MIB. |
| GET-Next-Request | Retrieves values sequentially. |
| SET-Request | Updates selected variables. |
| GET-Response | Returns the results of a GET-Request, GET-Next-Request, or SET-Request operation. |
| Trap/Alert | Enables an agent to spontaneously report important events or problems. |

Figure 2:
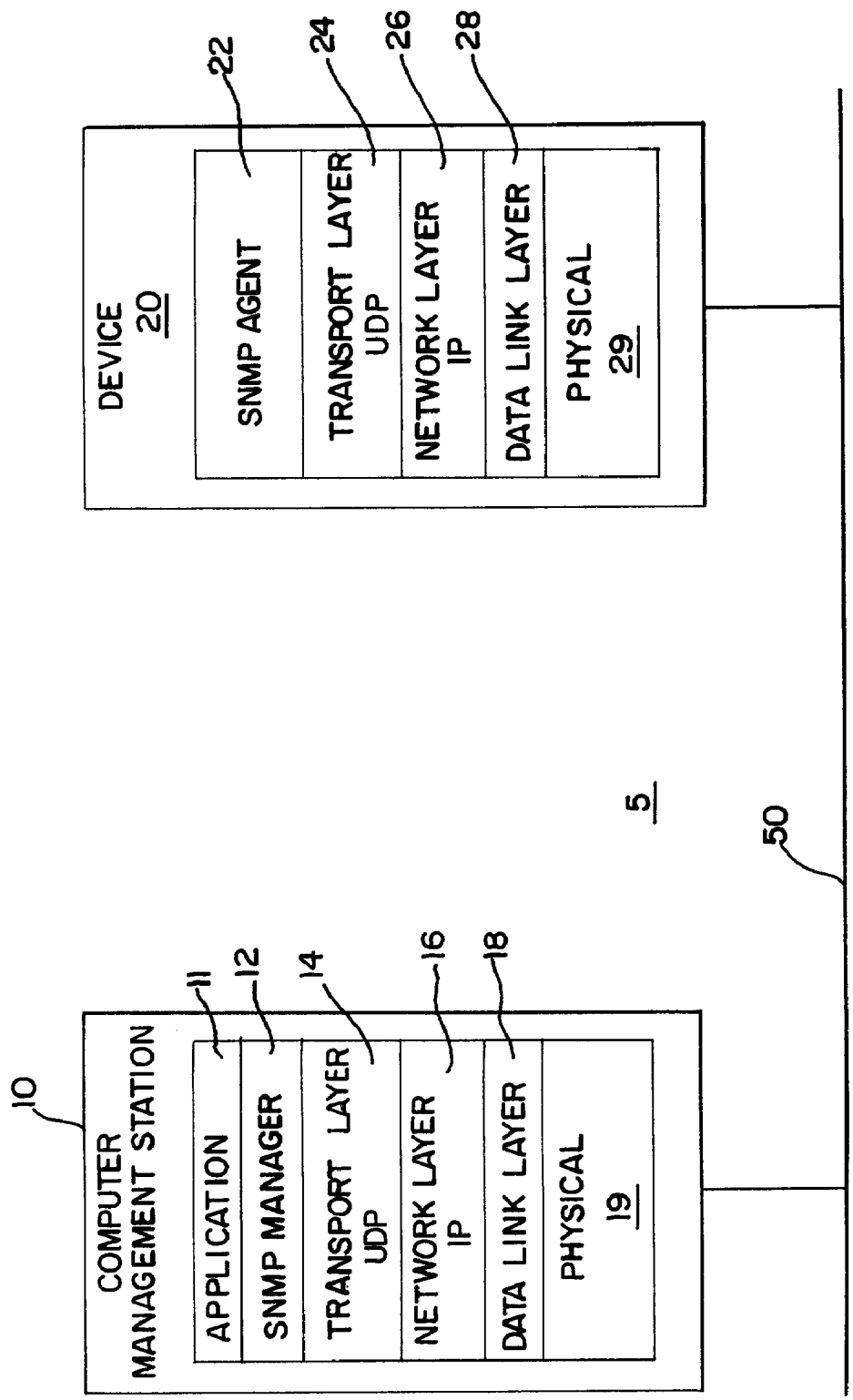
FIG. 2 is a block diagram of selected network components from the network of FIG. 1 illustrating software structure according to a preferred embodiment of the present invention.

FIG. 2 illustrates how the management station 10 may transport GET and SET SNMP commands to a device 20. FIG. 2 is a block diagram of the management station 10 connected to the device 20 over the network medium 50. The management station 10 includes the application 11, the SNMP manager's software, a transport layer 14, a network layer 16, a data link network 18 and a physical layer 19. The application 11 receives commands from a user at a user interface of the computer.10. For example, assuming the device 20 is a known modem, the user may use the application 11 to retrieve the configuration and state of air control used by the modem. The application 11 includes a program that configures a GET command for the SNMP manager 12. The SNMP manager 12 sends the GET command along with an object identifier that identifies the mdmECErrorControlUsed as the object or variable to be read at the modem device 20.

The SNMP manager 12 sends commands to the modem device 20 by encapsulating a command in a UDP packet at the transport layer 14. In the network layer 16, the Internet protocol (IP) is used to configure an Internet packet having the IP address of the modem device 20. The command is then sent using the data link layer 18 and the physical layer 19 over the network medium 50.

The command is received at the physical layer 29 of the device 20. The physical layer 29 sends the command up to the data link layer 28, the network layer 26, and the transport layer 24 to yield a de-packetized command at the SNMP agent 22. The SNMP agent software 22 and the device 20 perform the command of obtaining the configuration and state of the error control on the modem. The configuration and error control state of the modem is then sent back to the management station 10 in a likewise manner.

One advantage of a preferred embodiment of the present invention is that the device 20 may be unknown to the SNMP manager 12 in the management station 10. Another advantage is that the MIB for the device 20 may not reflect the current state of the device 20. For example, the device 20 may have been updated with new features and capabilities that are not reflected in the MIB of the device. These new features and capabilities may not be used until the MIB for the device 20 is updated. In a preferred embodiment of the present invention however, a device 20 may be described by a MID that includes generic managed objects. The generic managed object may be used to obtain information regarding the new features and capabilities. The generic MIB objects may further be used to send commands to the device 20 that will take advantage of the new features and capabilities.

Figure 3:
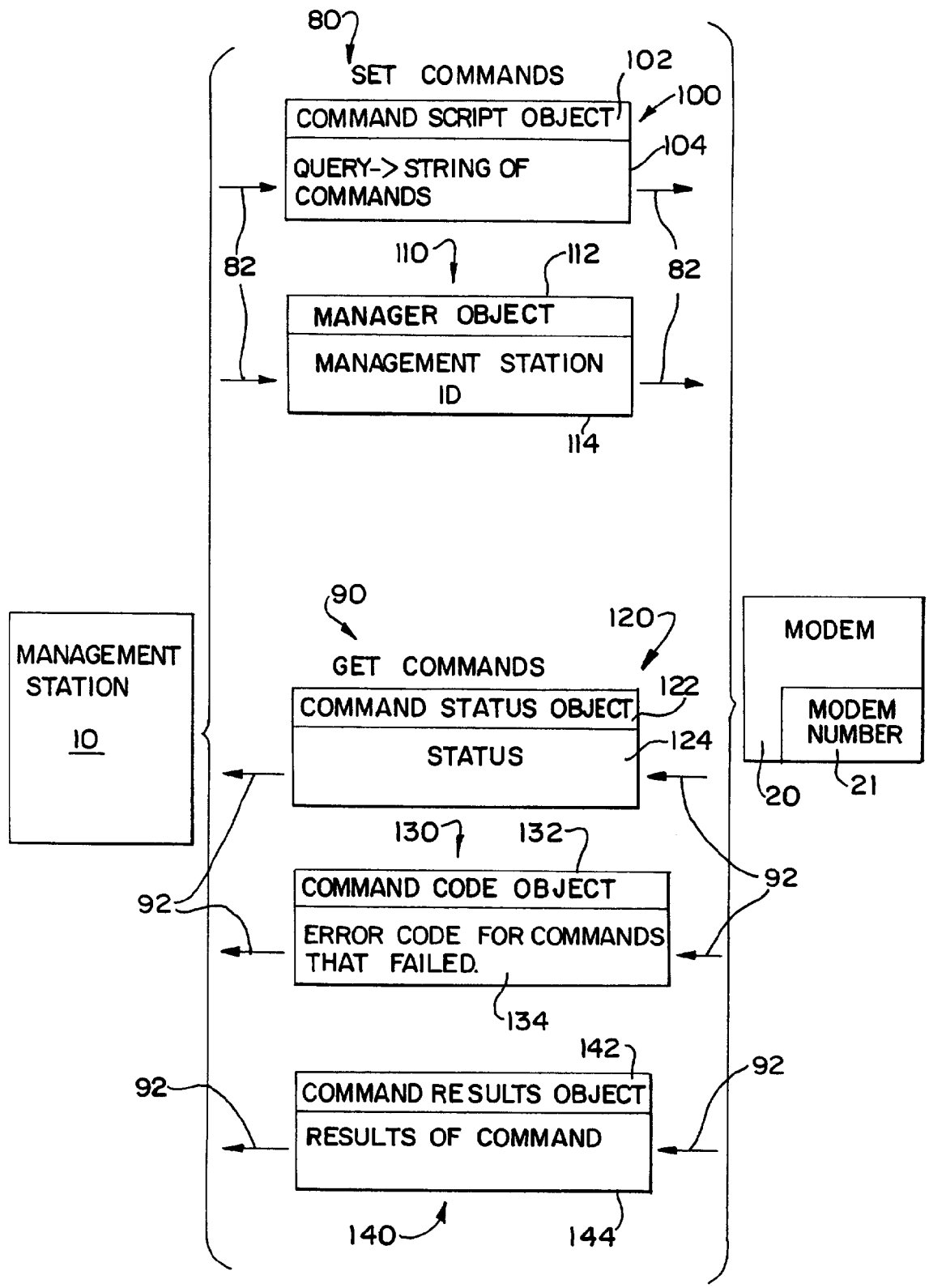
FIG. 3 shows generic managed objects used for managing unknown devices in the network shown in FIG. 1.

FIG. 3 shows a set of generic managed objects communicated between the management station 10 and a device 20, which in FIG. 3 is a modem. The managed objects are communicated in SET commands 80 and GET commands 90 in a manner described with reference to FIG. 2. The SET command 80 may be used to communicate a command script object 100 from the management station 10 to the modem 20 as shown by the arrows 82. The command script object 100 includes a command script object identifier 102 and a query or string of commands in a data string 104. If the modem 20 is unknown to the management station 10, the management station 10 may learn about the commands that modem 20 accepts by including, for example, "AT$" command in the data string 104 portion of the command script object 100. The command script object 100 is then included in a SET command, which is set to the modem 20.

The SET command with the command script object 100 maybe followed by a second SET command with a manager object 110. The management station 10 includes a management station ID 114 and the manager object 110 to identify the management station 10 as the source of the previously sent SET command. The manager object 110, which is identified by a manager object identifier 112 advantageously, specifies the source of the command to detect interference from other management stations. A GET command with the manager object 110 may be used to check the identity of management stations that are sending commands to the device 20.

The management station may send GET commands 90 to the modem 20 to obtain information about variables in the modem 20. The GET commands 90 may include a command status object 120 having a command status object identifier 122 and a status variable 124. The command status object 120 provides the management station 10 with information regarding the result of the most recently requested command. For example, the device may communicate that the command failed, aborted, performed successfully, or encountered other problems. The GET command at 90 may also include a command code object 130 having a command code object identifier 132 and a variable for an error code that indicates the reasons for the failure particular command..

A command results object 140 may be included as a generic object for retrieving raw data results from the execution of a command. The command results object 140 may include a command results object identifier 142 and a results of commands 144.

The above-described generic objects, which include the command script object 100, manager object 112, command status object 120, command results object 142 to the MIB of a device 20. Once the generic objects are part of a device MIB, a management station 10 can use the generic objects to use new features, capabilities and tasks that are not provided for in the MIB. It is to be understood by one of skill in the art that other generic objects may be added. Other generic objects may reflect expanded capabilities or features that are unique to particular devices.

Figure 4:
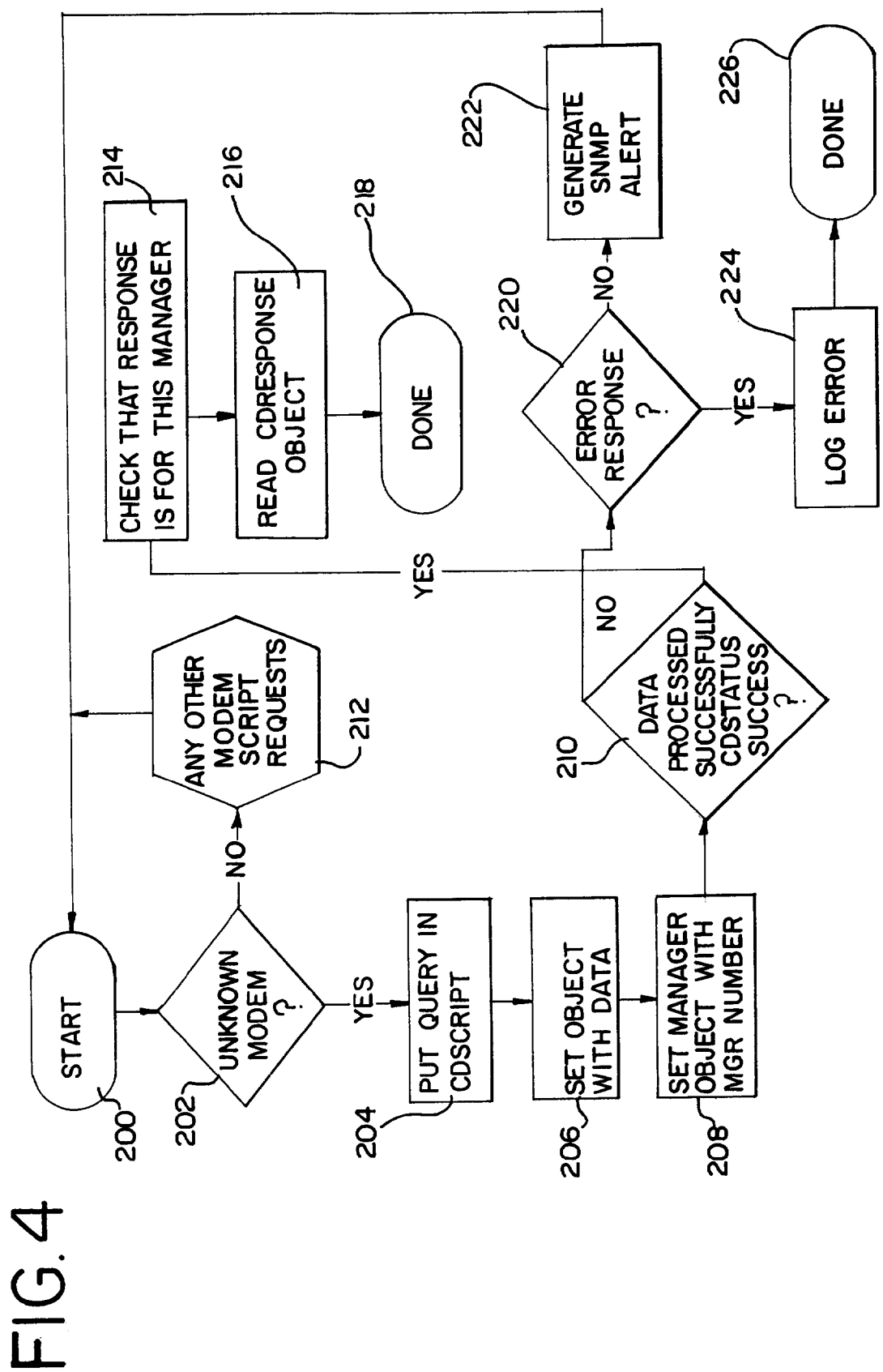
FIG. 4 is a flowchart illustrating a preferred embodiment of a method for managing devices of FIG. 1.

FIG. 4 is a flowchart for a method of forming network management tasks for a device that is unknown to the management station 10 (shown in FIGS. 1 through 3). The device that is used as an example in the flowchart of FIG. 4 is a modem, however, any other device may be used. In a preferred embodiment, the method shown in the flowchart of FIG. 4 is performed by the SNMP manager's software 12 and the management station 10.

As shown in the flowchart of FIG. 4, the method begins at the START box at step 200. Step 200 may be implemented in a variety of ways. For example, a user may execute commands at the application 11 (shown in FIGS. 1 and 2) that translates to a request for information from a device on the network. Alternatively, the manager software 12 may receive a request to operate on a device variable, or object, from another device connected to the network 5, or a data network 60 (shown in FIG. 1). For example, the network station 70 (shown in FIG. 1) may send a message to the manager software 12 that requests the baud rate of the modem 20.

At decision block 202, the manager's software 12 determines whether or not the modem is known. The modem is known if it is described by a MIB that is known to the manager software 12. For example, a known modem may use the modem MIB defined in RFC 1696. If the manager software 12 determines that the modem is a known modem, the manager software 12 performs SNMP commands on the known objects at step 212. If, on the other hand, the manager software 12 determines that the modem is an unknown modem at decision block 202, the manager software 12 uses a generic MIB object to perform the operations requested at step 200 using SNMP commands.

At step 204, the query, or operation requested at step 200 is used as the string of commands at 104 (shown in FIG. 3) in the command script object 100. At step 206, the command script object 100 (shown in FIG. 3) is used as the parameter of a SET-request command. At 208, the manager's software 12 uses the manager object 110 to identify the management station 10 as the manager that requested the previous command. At decision block 210, the manager software 12 performs a GET command using the command status object 120 to determine whether or not the previous command was performed successfully. If a status indicating a successful execution of the command is received, the manager software 12 checks that the response is for the management station 10 at step 214. The management software 12 may perform the check at step 214 by performing a GET command using the manager object 110. If an unknown management station ID is received at step 214, the manager software 12 detects interference from other management station. At step 216, the manager software 12 obtains the raw results from the command performed at steps 204 and 206 by performing a SET command on the command response object 140. The manager software 12 then uses the results at step 218 according to the original request at step 200.

If at step 210 the command status object 120 indicates that the data was not successfully processed, a check is performed at decision block 220 to determine whether or not an error occurred. If no error occurred, an SNMP alert is generated a step 222 to signal to the application 11 or the network station 70 that a potential problem exists with the command requested at steps 204 and 206. Potential problems that may be signaled include: conditions such as a command may not be supported, a command may be unable to run, or a command may have aborted. If, at decision block 220, an error is detected, the error is logged at step 224. The management software 12 is then notified of the error at step 226. One of ordinary skill in the art will appreciate that errors may be signaled and handled in a variety of different ways.

FIGS. 5A–5G show examples of definitions of generic managed objects, which have been defined using ASN.1 notation. The generic objects shown in FIGS. 5A–5G are part of a MIB for a telephony return cable modem in a data over cable system. One of ordinary skill in the art will understand that these objects do not limit the variety of commands that may be achieved using an expanded set of generic objects.

FIG. 5A is a definition for an object group for a set of generic objects. Object groups are well-known components of managed information bases in the SNMP protocol and therefore, require no further discussion. The object group defined in FIG. 5A identifies the objects shown in FIGS. 5B–5G.

FIG. 5B is a definition for an object that is used for indicating what went wrong when a command fails. FIG. 5C is an example of the manager object 120 in FIG. 3. FIG. 5D is an example of the command results object 140 in FIG. 3. FIG. 5E is an object that may be used to force conditions to avoid a hazardous condition. FIG. 5F is an example of the command script object 100 in FIG. 3. FIG. 5G is an example of the command status object in FIG. 3.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A system for managing a network comprising:
  at least one network device communicably connected to a network medium, said at least one network device being operable to execute a plurality of device commands;
  a management information base corresponding to said at least one network device, said management information base comprising at least one network object for maintaining device information and a generic object for performing tasks using at least one of said device commands; and
  a management station for issuing commands to retrieve and to modify the network objects of the network devices.

2. The system of claim 1 wherein the management station issues a set request command for modifying a selected network object.

3. The system of claim 1 wherein the management station issues a get response command for retrieving a selected network object.

4. The system of claim 1 wherein the generic object includes a command script object for communicating at least one device command.

5. The system of claim 4 wherein the management station issues a set request command for executing said at least one device command when the set request command modifies the command script object.

6. The system of claim 1 wherein the generic object includes a status object for communicating a status of a device command.

7. The system of claim 4 wherein the management station issues a get response command for retrieving data results from at least one device command when the get response command modifies the status object.

8. The system of claim 1 wherein the management station includes a Simple Network Management Protocol (SNMP) manager.

9. The system of claim 1 wherein the network devices include a SNMP agent.

10. The system of claim 1 wherein the MIB is a SNMP MIB.

11. A method for performing network management tasks comprising the steps of:
  communicably connecting a management station to at least one network device;
  providing a management information base for said at least one network device, said management information base comprising at least one network object and a command script object; and
  sending the command script object having at least one device command to the at least one network device.

12. The method of claim 11 further comprising the step of:
  providing a status object in said management information base; and
  sending the status object to request a status of said at least one device command.

13. The method of claim 11 further comprising the step of:
  providing a manager identifier object for identifying the management station that sent the command script object.

14. The method of claim 13 further comprising the step of:
  sending a manager identifier request command to identify the management station that sent the command script object.

15. The method of claim 11 further comprising the step of:
  providing a result object for communicating results data for the device command in the command script object; and
  sending the result object to retrieve the results data for the device command in the command script object.

* * * * *